United States Patent
Sawada et al.

(10) Patent No.: US 12,067,224 B2
(45) Date of Patent: Aug. 20, 2024

(54) DATA PROCESSING SYSTEM

(71) Applicant: SHIMADZU CORPORATION, Kyoto (JP)

(72) Inventors: Ryuji Sawada, Kyoto (JP); Shuhei Yamamoto, Kyoto (JP); Takeshi Ono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/028,950

(22) PCT Filed: Apr. 27, 2021

(86) PCT No.: PCT/JP2021/016760
§ 371 (c)(1),
(2) Date: Mar. 28, 2023

(87) PCT Pub. No.: WO2022/070493
PCT Pub. Date: Apr. 7, 2022

(65) Prior Publication Data
US 2023/0333721 A1 Oct. 19, 2023

(30) Foreign Application Priority Data
Sep. 29, 2020 (JP) .................................. 2020-163270

(51) Int. Cl.
*G06F 17/00* (2019.01)
*G06F 3/04845* (2022.01)
(Continued)

(52) U.S. Cl.
CPC ...... *G06F 3/04845* (2013.01); *G06F 3/04847* (2013.01); *G06T 3/40* (2013.01); *G06T 2200/24* (2013.01)

(58) Field of Classification Search
CPC ............. G06F 3/04845; G06F 3/04847; G06F 3/0484; G06F 2203/04806; G06T 3/40;
(Continued)

(56) References Cited

U.S. PATENT DOCUMENTS 7,391,423 B1* 6/2008 Manzari ................ G06T 3/4092
715/764
7,436,544 B2* 10/2008 Tanaka .................... H04N 1/393
358/1.9
(Continued)

FOREIGN PATENT DOCUMENTS

CN 112035038 A * 12/2020 ......... G06F 3/04845
JP 2003-32524 A 1/2003
(Continued)

OTHER PUBLICATIONS

International Search Report for PCT/JP2021/016760 dated, Jul. 13, 2021 (PCT/ISA/210).
(Continued)

*Primary Examiner* — Laurie A Ries
(74) *Attorney, Agent, or Firm* — Sughrue Mion, PLLC

(57) ABSTRACT

A data processing system includes an information processing device (2) and an information display device (4). The information processing device (2) includes a registration data holder (10) that holds image data registered in the data processing system (1), a field display part (12) configured to display, on the information display device, a display field including a plurality of image display areas, having the same size with each other, for displaying the image data, and an image display part (14) configured to display, in the image display area of the display field, a plurality of pieces of image data optionally selected from the image data held in the registration data holder (10), and the image display part (14) is configured to change an enlargement or reduction ratio of a plurality of pieces of the image data displayed in
(Continued)

the image display area of the display field in conjunction with each other based on operation by the user.

6 Claims, 8 Drawing Sheets

(51) Int. Cl.
*G06F 3/04847* (2022.01)
*G06T 3/40* (2006.01)
(58) Field of Classification Search
CPC ........ G06T 2200/24; G09G 5/02; G09G 5/14; G09G 5/36; G09G 5/38
See application file for complete search history.

(56) References Cited

U.S. PATENT DOCUMENTS

| | | | | |
|---|---|---|---|---|
| 9,552,792 B2* | 1/2017 | Tsukada | ................ | G06F 3/0482 |
| 10,100,891 B2* | 10/2018 | Masuda | ................ | H02P 15/00 |
| 2002/0135601 A1* | 9/2002 | Watanabe | ............ | G06F 3/0481 |
| | | | | 345/660 |
| 2003/0012418 A1 | 1/2003 | Uchida et al. | | |
| 2005/0097475 A1* | 5/2005 | Makioka | ............... | G06F 3/0481 |
| | | | | 715/788 |
| 2006/0072174 A1* | 4/2006 | Koike | ................. | H04N 1/3875 |
| | | | | 358/537 |
| 2008/0222560 A1* | 9/2008 | Harrison | ............ | G06F 3/04847 |
| | | | | 715/788 |
| 2009/0204913 A1* | 8/2009 | Kawano | ............. | G06F 3/04847 |
| | | | | 715/762 |
| 2010/0262911 A1* | 10/2010 | Kaplan | ................ | G11B 27/105 |
| | | | | 715/719 |
| 2011/0119619 A1* | 5/2011 | Fong | ..................... | H04N 23/62 |
| | | | | 715/764 |
| 2011/0122147 A1* | 5/2011 | Yasukawa | ............ | H04N 9/3179 |
| | | | | 345/589 |
| 2012/0139950 A1* | 6/2012 | Sogo | ......................... | G06T 3/40 |
| | | | | 345/661 |
| 2014/0223379 A1* | 8/2014 | Shin | .................... | G06F 3/04842 |
| | | | | 715/838 |
| 2015/0054855 A1* | 2/2015 | Sato | ......................... | G09G 5/14 |
| | | | | 345/661 |
| 2016/0165142 A1* | 6/2016 | Hada | ...................... | H04N 23/62 |
| | | | | 348/211.1 |
| 2020/0394973 A1* | 12/2020 | Ide | ......................... | G09G 3/002 |

FOREIGN PATENT DOCUMENTS

| | | | |
|---|---|---|---|
| JP | 2003-58138 A | 2/2003 | |
| JP | 2004-215041 A | 7/2004 | |
| JP | 2005-91430 A | 4/2005 | |
| JP | 2006-85276 A | 3/2006 | |
| JP | 2012-63834 A | 3/2012 | |
| JP | 2012-70031 A | 4/2012 | |
| WO | WO-2013038460 A1 * | 3/2013 | ......... G06F 3/04845 |
| WO | WO-2015085894 A1 * | 6/2015 | ......... G06F 3/04845 |
| WO | WO-2015108202 A1 * | 7/2015 | ......... G06F 3/04842 |

OTHER PUBLICATIONS

Written Opinion of the International Search Report for PCT/JP2021/016760 dated, Jul. 13, 2021 (PCT/ISA/237).
Office Action issued Oct. 17, 2023 in Japanese Application No. 2022-553453.
Japanese Office Action dated Jan. 9, 2024 in Application No. 2022-553453.
Chinese Office Action dated Apr. 12, 2024 in Application No. 202180061617.2.

* cited by examiner

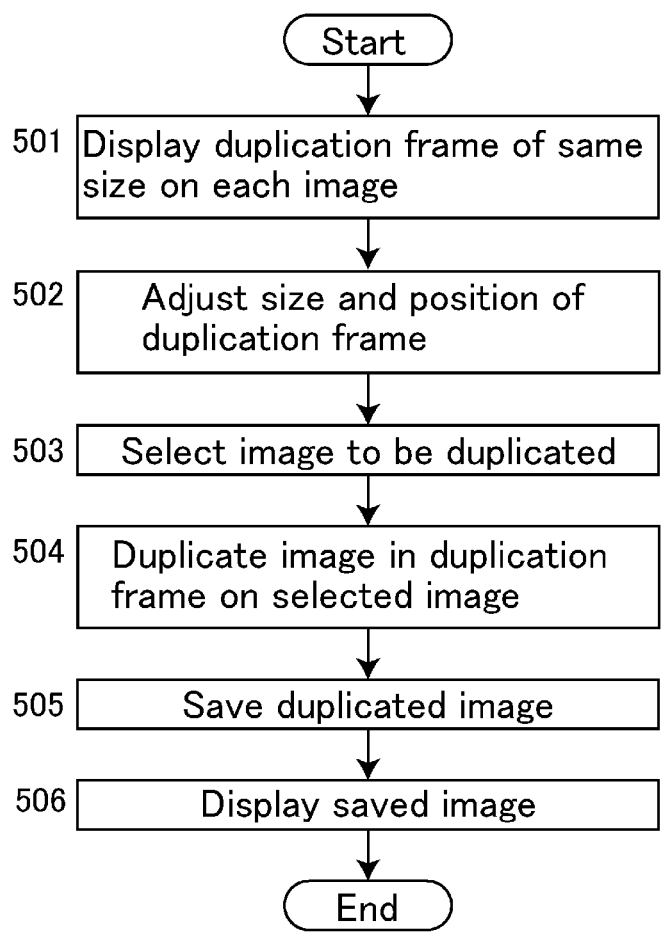

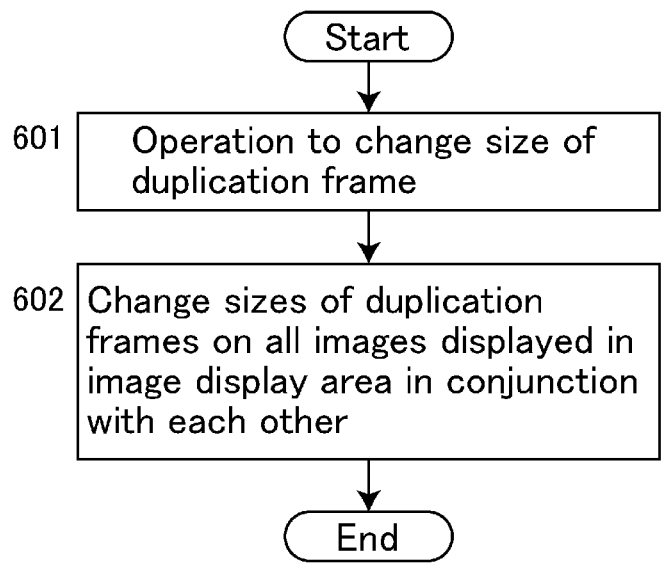
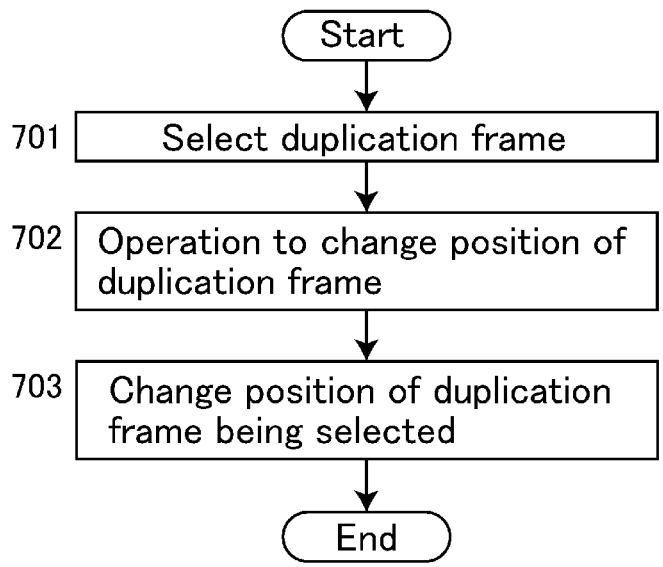

DATA PROCESSING SYSTEM

TECHNICAL FIELD

The present invention relates to a data processing system.

BACKGROUND ART

When studies and experiments using image data are collected into a sample, there are many pieces of work of processing a plurality of pieces of image data to the same enlargement or reduction ratio and the same size and arranging them with a scale bar attached to them. At that time, it is necessary to perform, for each image, work such as size change and trimming of image data, and creation and attachment of a scale bar to an image.

SUMMARY OF THE INVENTION

Problems to be Solved by the Invention

As described above, work of individually processing a plurality of pieces of image data is complicated, and errors such as that a wrong enlargement or reduction ratio is set to some pieces of image data may occur.

An object of the present invention is to facilitate handling of a plurality of pieces of image data and to reduce a work load of an operator.

Solutions to the Problems

A data processing system according to the present invention is a data processing system including an information processing device and an information display device. The information processing device includes a registration data holder that holds image data registered in the data processing system, a field display part configured to display, on the information display device, a display field including a plurality of image display areas, having the same size with each other, for displaying the image data, and an image display part configured to display, in the image display area of the display field, a plurality of pieces of image data optionally selected from the image data held in the registration data holder, and the image display part is configured to change an enlargement or reduction ratio of a plurality of pieces of the image data displayed in the image display area of the display field in conjunction with each other based on operation by the user.

That is, in the data processing system of the present invention, a plurality of pieces of image data optionally selected by the user among pieces of image data registered in advance are simultaneously displayed on a predetermined display field, and the user can collectively change enlargement or reduction ratios of the image data displayed on the display field.

Effects of the Invention

According to the data processing system of the present invention, a plurality of pieces of image data optionally selected by the user among pieces of image data registered in advance are simultaneously displayed on a predetermined display field, and the user can collectively change enlargement or reduction ratios of the image data displayed on the display field. Therefore, it is not necessary to individually change an enlargement or reduction ratio of a plurality of pieces of image data, handling of a plurality of pieces of image data is easy, and a work load of an operator is reduced.

BRIEF DESCRIPTION OF THE DRAWINGS

FIG. 6 is a flowchart illustrating an example of a series of operations related to duplication of an image in the embodiment.

FIG. 7 is a flowchart illustrating an example of operation of changing size of a duplication frame in the embodiment.

FIG. 8 is a flowchart illustrating an example of operation of changing a position of the duplication frame in the embodiment.

EMBODIMENT OF THE INVENTION

Hereinafter, an example of a data processing system according to the present invention will be described with reference to the accompanying drawings.

Figure 1:
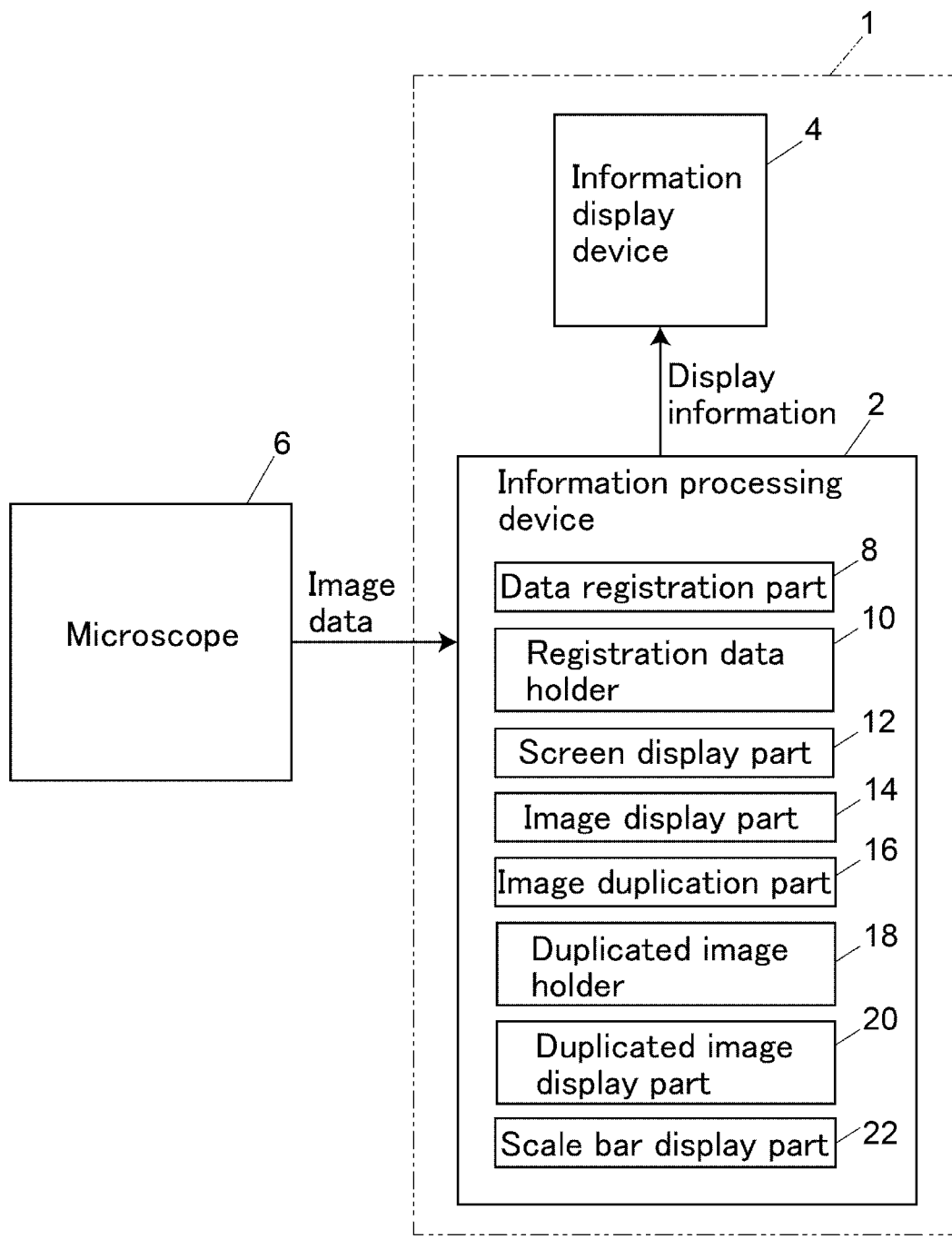
FIG. 1 is a block diagram illustrating an embodiment of a data processing system.

FIG. 1 illustrates a schematic configuration of the data processing system.

A data processing system 1 includes an information processing device 2 and an information display device 4. The information processing device 2 has a function of taking in a plurality of pieces of image data acquired by a microscope 6 and performing predetermined processing. The information processing device 2 is a computer device (for example, a personal computer) including an information storage medium such as a hard disk drive and a flash memory, and an electronic circuit including a central processing part (CPU), in which a computer program for realizing each function to be described later is introduced. The information display device 4 is a display (for example, a liquid crystal display) communicably connected to the information processing device 2.

The information processing device 2 includes a data registration part 8, a registration data holder 10, a field display part 12, an image display part 14, an image duplication part 16, a duplicated image holder 18, a duplicated image display part 20, and a scale bar display part 22. The data registration part 8, the field display part 12, the image display part 14, the image duplication part 16, the duplicated image display part 20, and the scale bar display part 22 are functions realized by the CPU executing a predetermined computer program introduced in the information processing device 2. The registration data holder 10 and the duplicated image holder 18 are functions realized by a partial storage area of an information storage medium in the information processing device 2.

The data registration part 8 registers data of an image acquired by the microscope 6 and/or data of an image obtained by analyzing such a microscope image together with scale information (for example, μm per pixel) of the image. The registration data holder 10 holds image data registered by the data registration part 8.

The data processing system 1 can collectively execute processing of a plurality of pieces of image data optionally selected from among images held in the registration data holder 10 by functions of the field display part 12, the image display part 14, the image duplication part 22, the duplicated image holder 16, the duplicated image display part 20, and the scale bar display part 22. Hereinafter, a function of the data processing system 1 will be described with reference to flowcharts of FIGS. 2 to 9 and a display field of FIG. 10.

(Image Display)

Figure 2:
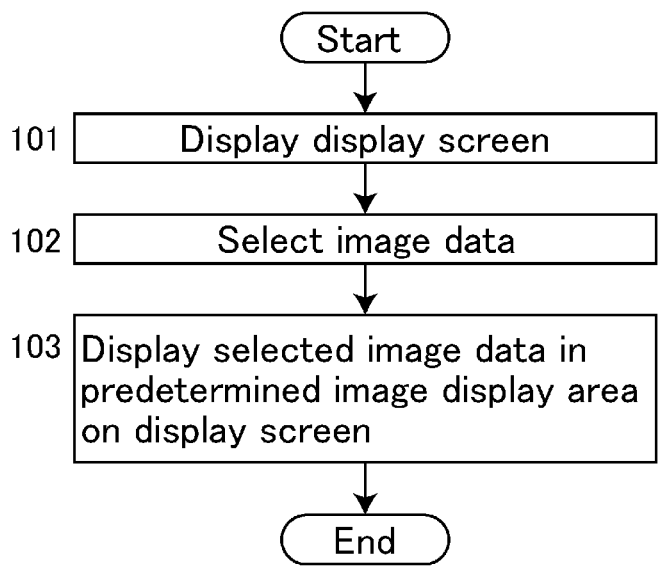
FIG. 2 is a flowchart illustrating an example of image display operation in the embodiment.
Figure 10:
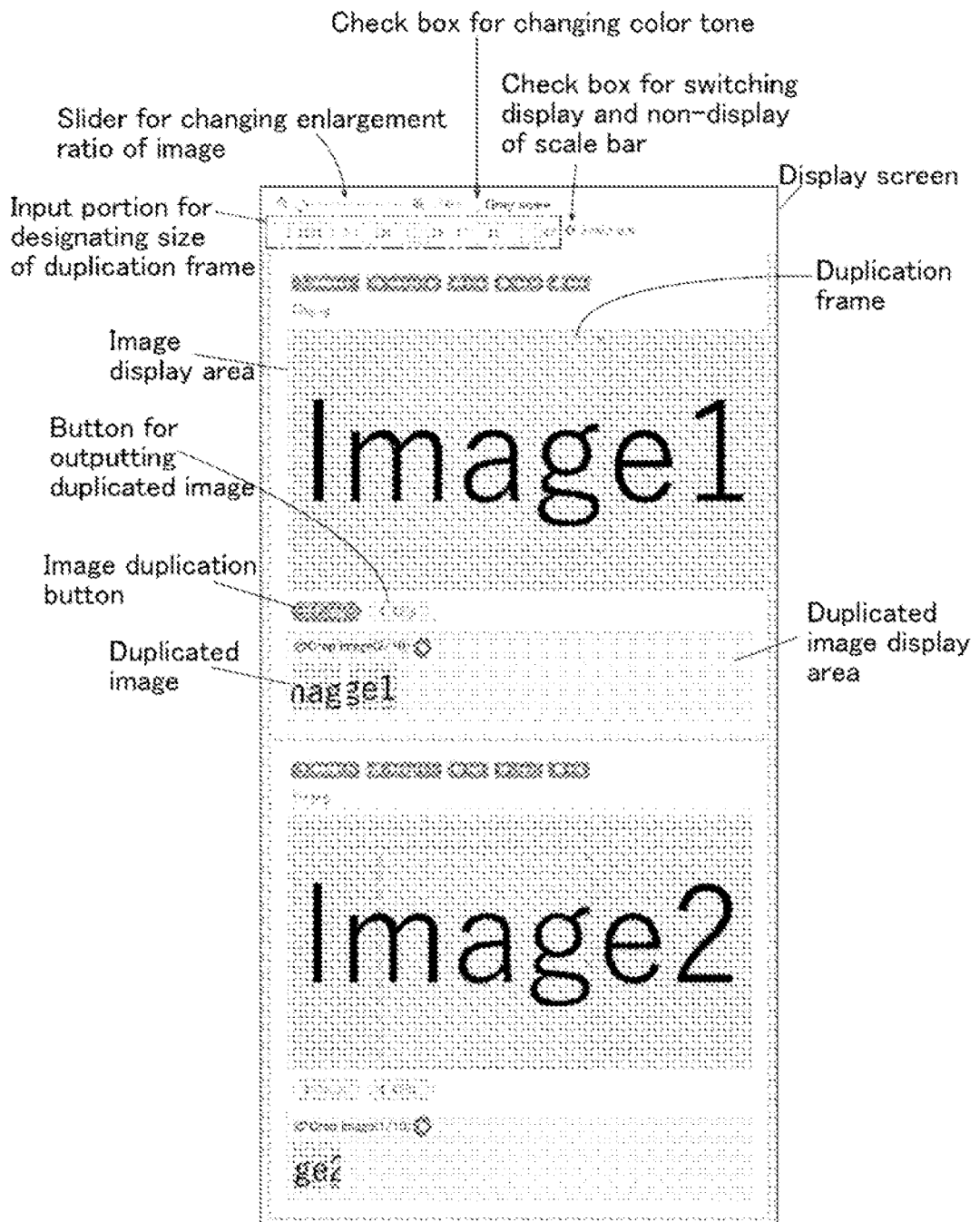
FIG. 10 is an example of a display field in the embodiment.

For example, when an instruction to start processing of registered image data is input, the field display part 12 displays a display field as illustrated in FIG. 10 on the information display device 4 (FIG. 2: Step 101). The display field is provided with a plurality of image display areas for displaying images, and when the user selects image data to be displayed in each image display area (FIG. 2: Step 102), the image display part 14 displays the image data selected by the user in an image display area of the display field (FIG. 2: Step 103). By the above, a plurality of images selected by the user are displayed on the same screen.

(Image Enlargement or Reduction)

Figure 3:
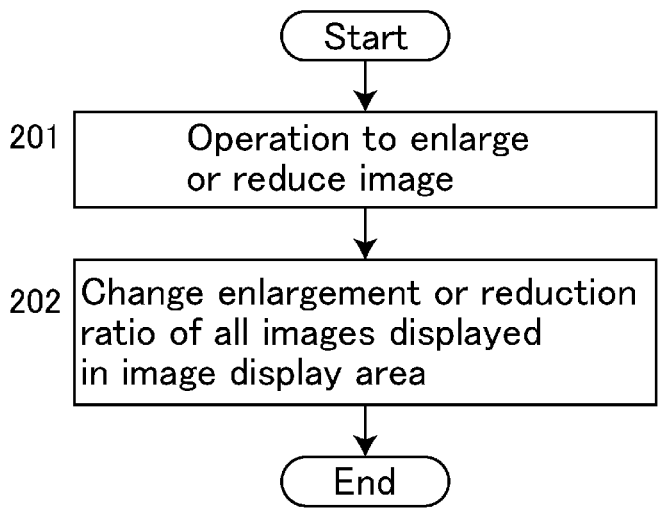
FIG. 3 is a flowchart illustrating an example of operation of changing size of a display image in the embodiment.

In a state where images are displayed in a plurality of image display areas on the display field, when the user performs operation of enlarging or reducing an image (Step 201 in FIG. 3), the image display part 14 changes an enlargement or reduction ratio of all the images displayed in the image display areas in conjunction with each other (Step 202 in FIG. 3).

In an example of FIG. 10, a slider for changing an enlargement ratio of an image is provided at the uppermost left end of the display field, and when the user operates the slider using a mouse or the like, enlargement or reduction ratios of all the images displayed in the image display areas are collectively changed. Note that the change of an enlargement or reduction ratio of an image is not limited to operation of the slider, and may be configured to be executed by input of a numerical value, scrolling with a mouse, or the like.

(Change in Color Tone of Image)

Figure 4:
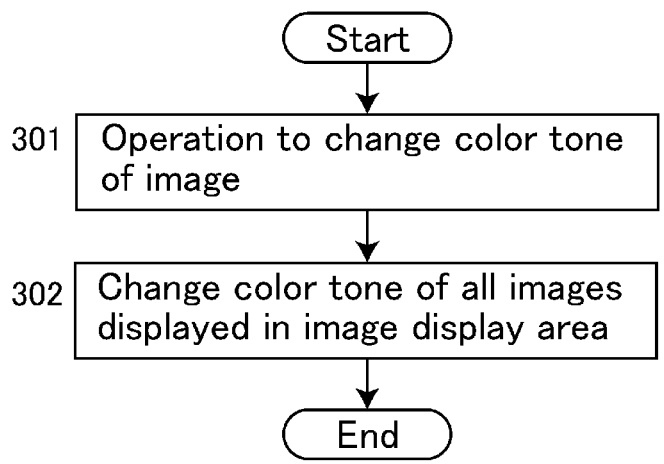
FIG. 4 is a flowchart illustrating an example of operation of changing a color tone of a display image in the embodiment.

In a state where images are displayed in a plurality of image display areas on the display field, when the user performs operation of changing a color tone of an image (Step 301 in FIG. 4), the image display part 14 collectively changes color tones of all the images displayed in the image display areas (Step 302 in FIG. 4).

In the example of FIG. 10, a check box for changing a color tone is provided at the uppermost center of the display field, and the user checks the check box to collectively change color tones of all the images displayed in image display areas. In this example, an operation portion (check box) for changing a color tone to gray scale is provided, but the color tone is not limited to gray scale, and an operation portion for changing to another color tone such as two tones of black and white may be provided.

(Change of Display Portion of Image)

Figure 5:
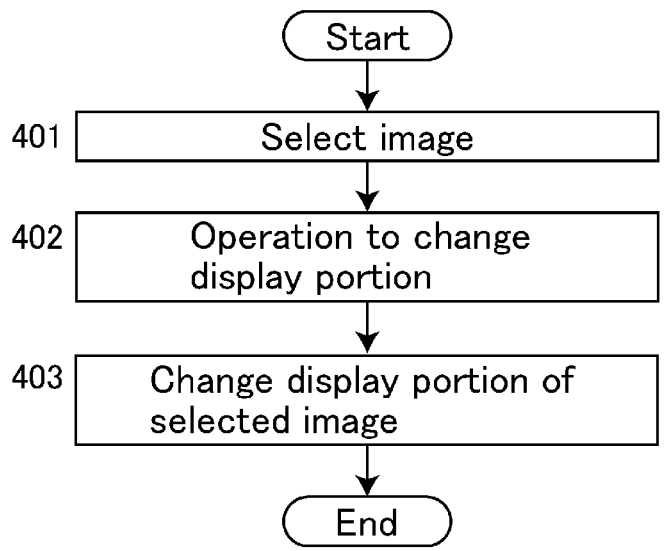
FIG. 5 is a flowchart illustrating an example of operation of changing a display portion of an image in the embodiment.

In a state where images are displayed in a plurality of image display areas of the display field, when the user selects an optional image from the images displayed in the image display areas (Step 401 in FIG. 5) and performs operation of changing a display portion (Step 402 in FIG. 5), the image display part 14 changes a portion displayed in an image display area in the selected image (step 403 in FIG. 5). Examples of the operation of changing a portion of an image displayed in an image display area include dragging with a mouse on a selected image, sliding of a display image by key input, and the like.

(Duplication of Image)

The image duplication part 16 displays duplication frames of the same size on all images displayed in image display areas of the display field (FIG. 6: Step 501). The size and position of the duplication frame displayed on each image can be optionally changed and adjusted by the user (FIG. 6: Step 502). The change of the size and position of the duplication frame will be described later. After the size and position of the duplication frame are adjusted, when the user selects an image to be duplicated (FIG. 6: Step 503), the image duplication part 16 duplicates an image in the duplication frame on the image selected by the user (FIG. 6: Step 504), and causes the duplicated image holder 18 to hold the duplicated image (FIG. 6: Step 505). The duplicated image display part 20 displays the image held in the duplicated image holder 18 in a predetermined display area of the display field (FIG. 6: Step 506).

In the example of FIG. 10, an image duplication button is provided at the lower left of each image display area, and a duplicated image display area is further provided below the image duplication button. When the user presses the image duplication button at the lower left of an optional image display area, an image in a duplication frame on an image of the image display area is duplicated, and the duplicated image is displayed in a duplicated image display area below the image display area.

Furthermore, in the example of FIG. 10, a button for outputting an image is provided beside the image duplication button, and when this button is pressed, a duplicated image can be output to software (for example, clipboard which is one of functions of Windows (registered trademark)) different from software constructing the data processing system 1. A duplicated image to be output is not limited to a duplicated image displayed in the duplicated image display area, and may be a direct duplicated image of an image displayed in an image display area.

(Change in Size of Duplication Frame)

In a state where a duplication frame is displayed on each image in an image display area, when the user performs operation of changing the size of the duplication frame (FIG. 7: Step 601), the image duplication part 16 changes the size of all displayed duplication frames in conjunction with each other (FIG. 7: Step 602). That is, the sizes of duplication frames on a plurality of images simultaneously displayed on the display field are the same.

In the example of FIG. 10, an input portion for designating the size of a duplication frame is provided in an upper part of the display field, and the user can collectively operate the sizes of all duplication frames by information such as a numerical value input to the input portion.

(Change of Position of Duplication Frame)

In a state where a duplication frame is displayed on each image in an image display area, when the user performs operation of selecting a duplication frame whose position is to be adjusted and changing the position of the duplication frame (FIG. 8: Steps 701 and 702), the image duplication part 16 changes the position of the selected duplication frame (FIG. 8: Step 703). Examples of the operation of changing the position of a duplication frame include dragging with a mouse and slide operation of a duplication frame by key input.

(Display of Scale Bar)

Figure 9:
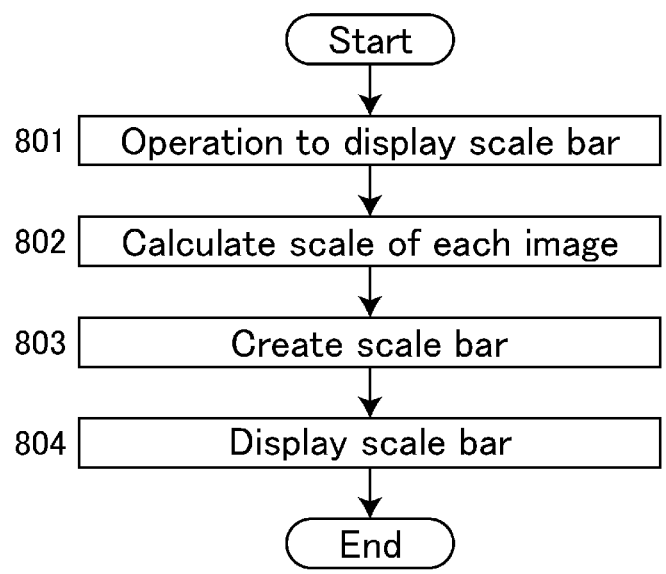
FIG. 9 is a flowchart illustrating an example of a series of operations related to display of a scale bar in the embodiment.

In a state where an image is displayed in an image display area of the display field, when the user performs operation of displaying a scale bar (Step 801 in FIG. 9), the scale bar display part 22 calculates the scale of the image being displayed using scale information (μm per pixel) of each image and a current enlargement or reduction ratio of each image held in the registration data holder 10 (Step 802 in FIG. 9), and creates a scale bar having a predetermined size (Step 803 in FIG. 9). Then, the created scale bar is displayed at a predetermined position on each image (FIG. 9: Step 804).

The display of a scale bar can be applied not only to an image displayed in an image display area but also to a duplicated image displayed in a duplicated image display area. The size of a scale bar is determined according to the size of a target image. For example, the number of the highest place of a scale bar is set to either 1 or 5 (for example, 10 μm, 50 μm, 100 μm, and the like), and the size of a scale bar suitable for each image is obtained by calculation so that the scale bar having the largest size within a length that is half or less the width of a target image is displayed in each image.

Figure 11:
FIG. 11 is an example in which a scale bar is displayed on a duplicated image.

In the example of FIG. 10, a check box for switching display and non-display of a scale bar is provided near the upper center of the display field, and when the user checks the check box, a scale bar as illustrated in FIG. 11 is displayed at a predetermined position of each image being displayed. Note that the scale bar may be created when the user checks the check box to display the scale bar, or may be created when an image is displayed in an image display area.

Note that the example described above is merely an example of an embodiment of the data processing system according to the present invention, and the embodiment of the data processing system according to the present invention is as described below.

An embodiment of the data processing system according to the present invention is a data processing system including an information processing device and an information display device. The information processing device includes a registration data holder that holds image data registered in the data processing system, a field display part configured to display, on the information display device, a display field including a plurality of image display areas, having the same size with each other, for displaying the image data, and an image display part configured to display, in the image display area of the display field, a plurality of pieces of image data optionally selected from the image data held in the registration data holder, and the image display part is configured to change an enlargement or reduction ratio of a plurality of pieces of the image data displayed in the image display area of the display field in conjunction with each other based on operation by the user.

In a first aspect of the embodiment, the image display part is configured to collectively change color tones of a plurality of pieces of the image data displayed in the image display area of the display field based on operation by the user. According to such an aspect, it is not necessary for the user to individually change a color tone of a plurality of images, and a work load related to change of a color tone is reduced.

In a second aspect of the embodiment, the image display part is configured to individually change, based on operation by the user, a display portion of the image data optionally selected from a plurality of pieces of the image data displayed in the image display area of the display field. According to such an aspect, a portion that the user desires to use within a range shown in image data can be selected for each piece of image data. This second aspect can be combined with the first aspect.

In a third aspect of the embodiment, the information processing device further includes an image duplication part configured to display a duplication frame, having the same size with each other, indicating a duplication area on each piece of image data displayed in each of a plurality of the image display areas, and to duplicate each image of an area in the duplication frame of each piece of image data based on operation by the user, a duplicated image holder configured to hold a duplicated image of each area by the image duplication part, and a duplicated image display part configured to display, in a predetermined area in the display field, the duplicated image held by the duplicated image holder. According to such an aspect, a portion to be duplicated in each piece of image data displayed in the image display area can be optionally duplicated, and the user can check the duplicated image. This third aspect can be combined with the first aspect and/or the second aspect described above.

In the third aspect, the image duplication part is configured to change the size of the duplication frame displayed on the each piece of image data in conjunction with each other based on operation by the user. According to such an aspect, the user can duplicate a partial image of each of a plurality of pieces of image data in the same size. This eliminates the need to individually adjust the sizes of a plurality of duplicated images in a case where a document for comparing the duplicated images is created, and reduces a work load of the user.

Further, in the third aspect, the image duplication part is configured to individually change a position on the image data of the duplication frame designated by the user among the duplication frames displayed on each piece of the image data based on operation by the user. By the above, the user can adjust the position of a portion to be duplicated in each piece of image data for each piece of image data.

In a fourth aspect of the embodiment, the registration data holder is configured to hold the image data together with scale information of the image data, and the information processing device further includes a scale bar display part configured to create a scale bar of image data displayed in the image display area by using an enlargement or reduction ratio of the image data and scale information of the image data and to display the scale bar. By the above, since a scale bar suitable for an image displayed in each image display area is automatically created and displayed, it is not necessary for the user to create and attach a scale bar for each image, and a work load of the user is reduced. This fourth aspect can be combined with the first aspect, the second aspect, and/or the third aspect described above.

DESCRIPTION OF REFERENCE SIGNS

1: Data processing system
2: Information processing device
4: Information display device
6: Microscope
8: Data registration part
10: Registration data holder
12: Field display part
14: Image display part
16: Image duplication part

18: Duplicated image holder
20: Duplicated image display part
22: Scale bar display part

The invention claimed is:

1. A data processing system comprising an information processing device and an information display device,
   wherein the information processing device includes:
   a registration data holder that holds image data registered in the data processing system;
   a field display part configured to display, on the information display device, a display field including a plurality of image display areas, having the same size with each other, for displaying the image data;
   an image display part configured to display, in the image display area of the display field, a plurality of pieces of image data selected from the image data held in the registration data holder;
   an image duplication part configured to display a duplication frame in the display field, the duplication frame having the same size with each other and indicating a duplication area on each piece of image data displayed in each of a plurality of the image display areas of the display field, and to duplicate each image of an area in the duplication frame of each piece of image data based on operation by a user;
   a duplicated image holder configured to hold a duplicated image of each area by the image duplication part; and
   a duplicated image display part configured to display, in a predetermined area in the display field, each duplicated image held by the duplicated image holder, and
   the image display part is configured to change an enlargement or reduction ratio of the plurality of pieces of image data displayed in the image display area of the display field in conjunction with each other based on operation by a user.

2. The data processing system according to claim 1, wherein the image display part is configured to collectively change color tones of the plurality of pieces of image data displayed in the image display area of the display field based on operation by a user.

3. The data processing system according to claim 1, wherein the image display part is configured to individually change, based on operation by a user, a display portion of the image data optionally selected from the plurality of pieces of image data displayed in the image display area of the display field.

4. The data processing system according to claim 1, wherein the image duplication part is configured to change size of the duplication frame displayed on the each piece of image data in conjunction with each other based on operation by a user.

5. The data processing system according to claim 1, wherein the image duplication part is configured to individually change a position on the image data of the duplication frame designated by a user among the duplication frames displayed on the each piece of image data based on operation by the user.

6. The data processing system according to claim 1, wherein
   the registration data holder is configured to hold the image data together with scale information of the image data, and
   the information processing device further includes a scale bar display part configured to create a scale bar of image data displayed in the image display area by using an enlargement or reduction ratio of the image data and scale information of the image data and to display the scale bar.

* * * * *